(12) United States Patent
Kagami

(10) Patent No.: US 11,450,915 B2
(45) Date of Patent: Sep. 20, 2022

(54) BATTERY PACK

(71) Applicant: TOYOTA JIDOSHA KABUSHIKI KAISHA, Toyota (JP)

(72) Inventor: Ryo Kagami, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 294 days.

(21) Appl. No.: 16/811,771

(22) Filed: Mar. 6, 2020

(65) Prior Publication Data

US 2020/0313126 A1 Oct. 1, 2020

(30) Foreign Application Priority Data

Mar. 27, 2019 (JP) .............................. JP2019-061142

(51) Int. Cl.
*H01M 10/0562* (2010.01)
*H01M 10/04* (2006.01)
*H01M 4/13* (2010.01)
*H01M 50/20* (2021.01)
*H01M 4/02* (2006.01)

(52) U.S. Cl.
CPC ............. *H01M 50/20* (2021.01); *H01M 4/13* (2013.01); *H01M 10/0413* (2013.01); *H01M 10/0562* (2013.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| 6,465,125 | B1 | 10/2002 | Takami et al. |
| 2005/0079407 | A1* | 4/2005 | Higashino ........... H01M 50/209 429/162 |

(Continued)

FOREIGN PATENT DOCUMENTS

| JP | 2004006408 A | 1/2004 |
| JP | 2016157586 A | 9/2016 |

*Primary Examiner* — Christopher P Domone
(74) *Attorney, Agent, or Firm* — Dickinson Wright PLLC

(57) ABSTRACT

According to the present disclosure, provided is a battery pack that can prevent the surface pressure applied to a cell group at the time of restraint from being uneven, and can stably demonstrate a high level of battery performance. The battery pack disclosed herein includes a cell group in which a plurality of single cells is arranged, and a restraining member that restrains the cell group. Each of the single cells of this battery pack is an all-solid-state cell including a stacked electrode body in which sheet materials composed of a positive electrode, a negative electrode, and a solid electrolyte layer are stacked, and an outer package body that accommodates the stacked electrode body. The cell group of the battery pack disclosed herein is configured such that the ratio of the maximum value $K_1$ of spring constant to the minimum value $K_2$ of spring constant along the arrangement direction $(K_1/K_2)$ is 1 or more and 3 or less. As a result, the surface pressure applied to the cell group at the time of restraint can be prevented from being uneven, and a high level of battery performance can be exhibited.

5 Claims, 8 Drawing Sheets

(56) References Cited

U.S. PATENT DOCUMENTS

| | | | |
|---|---|---|---|
| 2011/0262785 A1* | 10/2011 | Johnson | H01M 50/502 |
| | | | 429/66 |
| 2016/0064707 A1* | 3/2016 | Kritzer | H01M 10/0413 |
| | | | 429/90 |
| 2018/0175345 A1* | 6/2018 | Schmid-Schoenbein | ................... |
| | | | H01M 10/647 |
| 2019/0229310 A1* | 7/2019 | Fujishima | H01M 50/20 |
| 2020/0044298 A1* | 2/2020 | Subramanian | H01M 10/0468 |

* cited by examiner

BATTERY PACK

CROSS REFERENCE TO RELATED APPLICATIONS

This application claims priority based on Japanese Patent Application No. 2019-61142 filed on Mar. 27, 2019, the entire contents of which are incorporated herein by reference.

BACKGROUND

1. Technical Field

The present disclosure relates to a battery pack including a cell group in which a plurality of all-solid-state cells as single cells are arranged.

2. Description of the Related Art

High-power secondary batteries such as lithium ion secondary batteries and nickel metal hydride cells are becoming increasingly important as on-vehicle power supplies or power supplies for personal computers, portable terminals and the like. Examples of forms of such high-power secondary batteries include a liquid cell using an electrolytic solution as an electrolyte, an all-solid cell using a solid electrolyte, and the like. For example, an all-solid-state cell includes a stacked electrode body in which a plurality of sheet materials composed of a positive electrode sheet, a negative electrode sheet, and a solid electrolyte layer are stacked, and an outer package body made of a laminate film that houses the stacked electrode body.

The all-solid-state cells can be used in the state of, for example, a battery pack. Such a battery pack includes a cell group in which a plurality of all-solid-state cells as single cells are arranged, and a restraining member that restrains the cell group along the arrangement direction of the single cell. An example of such a battery pack is disclosed in Japanese Patent Application Publication No. 2016-157586. In the battery pack disclosed in the document, a plurality of laminate cells (all solid cells) are stacked, and the plurality of laminate cells are restrained by end plates (restraining members).

SUMMARY

Here, a battery pack including a plurality of all-solid-state cells as single cells is expected to demonstrate performance corresponding to the number of single cells to be used, but the battery performance may be lower than expected. In recent years, it has become desirable to develop a technique capable of solving such a problem. The inventors have conducted various studies to this purpose. As a result, the inventors have found that in a battery pack using an all-solid-state cell as a single cell, the battery performance becomes lower than expected when the surface pressure applied to a cell group is uneven when the cell group is restrained.

Specifically, a stacked electrode body in which a plurality of sheet materials (positive electrode, negative electrode, solid electrolyte layer) are stacked is used for an electrode body of an all-solid-state cell. At this time, where the surface pressure applied to the cell group at the time of restraint is uneven, a void may be formed between the sheet materials in a region where the surface pressure is weak. In this case, an appropriate charge/discharge reaction is not performed at the portion where the void is formed, and thus performance degradation such as increase in battery resistance may occur.

The present disclosure has been accomplished to solve the above-described problems, and an object thereof is to provide a battery pack in which the occurrence of unevenness in the surface pressure applied to the cell group at the time of restraint is prevented, and a high level of battery performance can be stably demonstrated.

In order to achieve the above object, the present disclosure provides a battery pack having the following configuration.

The battery pack disclosed herein includes a cell group in which a plurality of single cells are arranged along a predetermined arrangement direction, and a restraining member that restrains the cell group along the arrangement direction. The single cell of the battery pack is an all-solid-state cell including a stacked electrode body in which a plurality of sheet materials including a positive electrode, a negative electrode, and a solid electrolyte layer are stacked, and an outer package body made of a laminate film that accommodates the stacked electrode body. Further, in the battery pack disclosed herein, the cell group is configured such that, in a front view, where a spring constant in a region having a maximum spring constant along the arrangement direction is taken as a maximum value $K_1$, and a spring constant in a region having a minimum spring constant along the arrangement direction is taken as a minimum value $K_2$, a relationship between the maximum value $K_1$ and the minimum value $K_2$ satisfies formula (1) below:

$$1 \leq K_1/K_2 \leq 3 \qquad (1)$$

In order to solve the above-mentioned problems, the inventors studied the cause of the occurrence of uneven surface pressure in a battery pack in which an all-solid-state cell is a single cell, and found the following.

Generally, a manufacturing tolerance (dimensional error) may occur in the thickness of a sheet material constituting an electrode body due to uneven coating during formation of the mix layer, uneven pressure during rolling, and the like. In a liquid cell using an electrolytic solution as an electrolyte, the electrolytic solution filled in a case functions as a buffer material, so that the influence of the manufacturing tolerance on the restraining pressure becomes very small. Meanwhile, in an all-solid-state cell in which a solid electrolyte layer is formed as an electrolyte, there is no electrolyte solution that functions as a buffer material, and thus the manufacturing tolerance of the sheet material tends to have a greater influence on the restraining pressure. Where a plurality of sheet materials are stacked to form a stacked electrode body, and a cell group is constructed by arranging a plurality of single cells having the stacked electrode body, the influence of the manufacturing tolerance increases, so that the elasticity of the cell group along the arrangement direction becomes non-uniform in a front view. Where such a cell group with non-uniform elasticity in a front view is restrained, the surface pressure may become uneven, leading to a decrease in battery performance.

Based on the above-described finding, the inventors have considered that it would be possible to obtain a uniform surface pressure when a cell group is restrained by configuring the cell group such that the elasticity along the arrangement direction in a front view becomes uniform (that is, the maximum value $K_1$ of the spring constant obtained in the region having the maximum spring constant and the minimum value $K_2$ of the spring constant obtained in the region having the minimum spring constant, in a front view, satisfy the relationship of $K_1/K_2 \leq 3$). The effect by making the elasticity of the said cell group uniform in a front view was experimentally confirmed.

In one embodiment of the battery pack disclosed herein, the cell group is configured such that, in a front view, where a total thickness in a region having a maximum total thickness of the plurality of stacked electrode bodies is taken as a maximum value $T_1$, and the total thickness in a region having a minimum total thickness is taken as a minimum value $T_2$, a relationship between the maximum value $T_1$ and the minimum value $T_2$ satisfies formula (2) below.

$$1 \leq T_1/T_2 \leq 1.01 \qquad (2)$$

A cell group in which the elasticity along the arrangement direction is uniform in a front view can be exemplified by a cell group in which the sum total of thicknesses of the stacked electrode bodies included in the cell group (total thickness of the stacked electrode bodies) is uniform in a front view. The total thickness of the stacked electrode bodies greatly affects the elasticity in the arrangement direction of the cell group. For this reason, by making the total thickness of the stacked electrode bodies uniform in a front view, it is possible to easily prevent uneven surface pressure when the cell group is restrained.

In an embodiment in which the total thickness of the stacked electrode bodies is made uniform in a front view, it is preferable that a thickest part be formed at one end in the width direction of each stacked electrode body, a thinnest part be formed at the other end, and the cell group be configured such that the thickest part of the stacked electrode body of one single cell be adjacent to the thinnest part of the stacked electrode body of the other single cell between two adjacent single cells.

By intentionally forming stacked electrode bodies having the thickest part and the thinnest part and constructing a cell group by arranging the single cells so that the total thickness of the stacked electrode bodies is uniform in a front view, as in the present embodiment, it is possible to reduce the influence of manufacturing tolerance that can occur when producing the sheet materials. For this reason, in this embodiment, it is possible to easily construct a cell group in which the total thickness of the stacked electrode bodies is uniform in a front view.

Further, in an embodiment in which the total thickness of the stacked electrode bodies is uniform in a front view, a thickest part is formed at one end in the width direction of each sheet material, a thinnest part is formed at the other end, and the stacked electrode body is configured such that the thickest part of one sheet material is adjacent to the thinnest part of the other sheet material between two adjacent sheet materials.

By intentionally forming sheet materials having the thickest part and the thinnest part and stacking the sheet materials so that the thickness of each of the plurality of laminated electrode bodies is uniform in a front view, as in the present embodiment, it is also possible to reduce the influence of manufacturing tolerance that can occur when producing the sheet materials. For this reason, in this embodiment, it is possible to easily construct a cell group in which the total thickness of the stacked electrode bodies is uniform in a front view.

In one embodiment of the battery pack disclosed herein, a thickest part is formed at the center in the width direction of each stacked electrode body, a thinnest part is formed at both ends in the width direction, and the stacked electrode bodies are accommodated in the outer package body in a state where the center in the width direction of the stacked electrode body is shifted from the center in the width direction of the outer package body, so that the thickest part of the stacked electrode body of one single cell is adjacent to the thinnest part of the stacked electrode body of the other single cell between two adjacent single cells.

The cell group of the present embodiment is another example of the cell group in which the elasticity along the arrangement direction is uniform in a front view. In the cell group of the present embodiment, the accommodation position of the stacked electrode bodies in the outer package body is adjusted. In this embodiment, the elasticity along the arrangement direction can also be made uniform in a front view. When such an embodiment is adopted, it is possible to prevent the surface pressure applied to the cell group from being uneven at the time of restraint, and a high level of battery performance can be stably demonstrated.

Further, in one embodiment of the battery pack disclosed herein, the stacked electrode body has a Young's modulus of 0.1 GPa or more.

A stacked electrode body having such a high Young's modulus is unlikely to be deformed by an external pressure, so that there is a high possibility that the uneven surface pressure is generated. With the battery pack disclosed herein, even when such a stacked electrode body is used, the occurrence of uneven surface pressure can be prevented and a high level of battery performance can be stably demonstrated.

DETAILED DESCRIPTION

Hereinafter, a battery pack using an all-solid-state cell of a lithium ion secondary battery as a single cell will be described as an example of the battery pack disclosed herein. The single cell that can be used in the battery pack disclosed herein is not limited to a lithium ion secondary battery as long as it takes the form of an all-solid-state cell, and for example, another secondary battery such as a nickel metal hydride cell may be used. Further, matters other than those specifically mentioned in the present specification and necessary for the implementation of the present disclosure can be grasped as design matters for a person skilled in the art which are based on the related art in the pertinent field.

Figure 1:
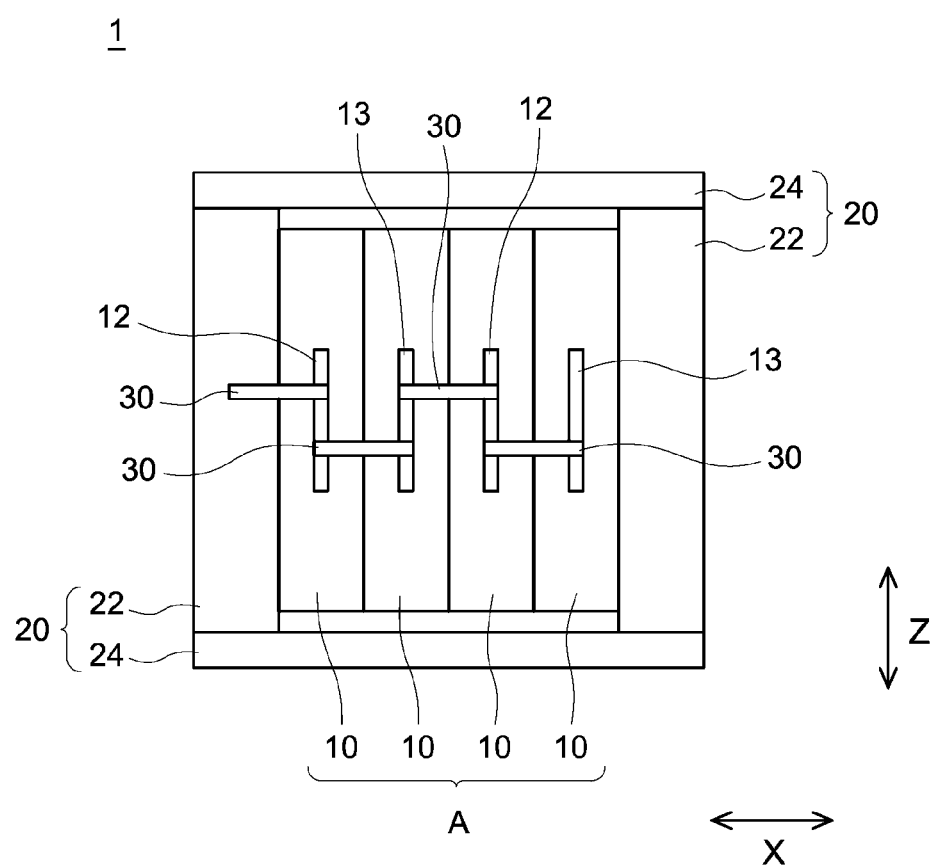
FIG. 1 is a side view schematically showing a battery pack according to the first embodiment.

Also, in the following drawings, members/parts having the same action are denoted by the same reference numerals. In addition, the dimensional relationship (length, width, thickness, and the like) in each drawing does not reflect the actual dimensional relationship. In each figure, the symbol X indicates the "arrangement direction (of single cells)", the symbol Y indicates the "width direction (of single cell)", and the symbol Z indicates the "height direction (of single cell)". Further, in the present specification, the left side in the arrangement direction X in FIG. 1 is referred to as the "upstream side (in the arrangement direction X)", and the right side is referred to as the "downstream side". Further, in the present specification, a point of view when viewing the battery pack from the upstream side in the arrangement direction X is referred to as the "front view". In addition, the above-mentioned rules are defined for convenience of explanation, and are not intended to limit the installation mode of using the battery pack.

1. First Embodiment (1) Overall Configuration

FIG. 1 is a side view schematically showing a battery pack according to the first embodiment. As shown in FIG. 1, a battery pack 1 according to the present embodiment includes a cell group A in which a plurality of (four in FIG. 1) single cells 10 are arranged along a predetermined arrangement direction X, and a restraining member 20 that restrains the cell group A along the arrangement direction X. In the battery pack 1 according to the present embodiment, a pressure dispersion material such as a buffer plate is not inserted between the single cells 10, and the single cells 10 are disposed in close contact with each other. Each single cell 10 includes a pair of electrode terminals including a positive electrode terminal 12 and a negative electrode terminal 13. Each of the pairs of electrode terminals is electrically connected by a bus bar 30.

The restraining member 20 includes a pair of restraining plates 22 disposed on both outer sides in the arrangement direction X and a bridging member 24 that bridges the pair of restraining plates 22. The restraining member 20 sandwiches the cell group A between the pair of restraining plates 22 and applies a restraining pressure to each single cell 10 constituting the cell group A. At this time, from the viewpoint of more suitably preventing the formation of voids between the sheet materials constituting the stacked electrode body 14, the restraining pressure generated by the restraining member 20 may be set to 20 kN or more, 30 kN or more, 40 kN or more, or even 50 kN or more. Although details will be described later, according to the present embodiment, even when such a high restraining pressure is applied to the cell group A, it is possible to easily prevent the occurrence of uneven surface pressure. Meanwhile, from the viewpoint of preventing damage to the stacked electrode bodies and the outer package body, the upper limit of the restraining pressure applied to the cell group A may be set to 3000 kN or less, 2000 kN or less, 1000 kN or less, or even 500 kN or less.

(2) Structure of Single Cell

Figure 2:
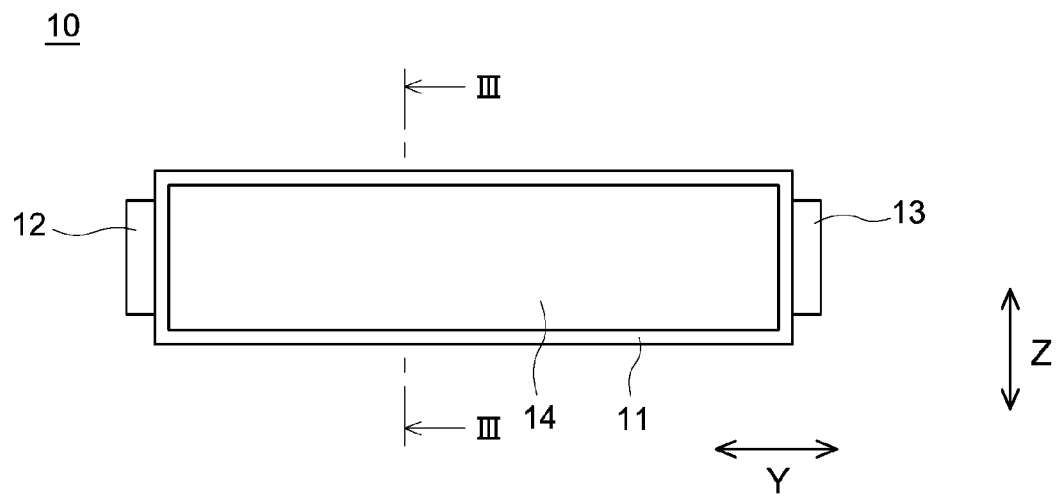
FIG. 2 is a front view schematically showing a single cell used in the first embodiment.
Figure 3:
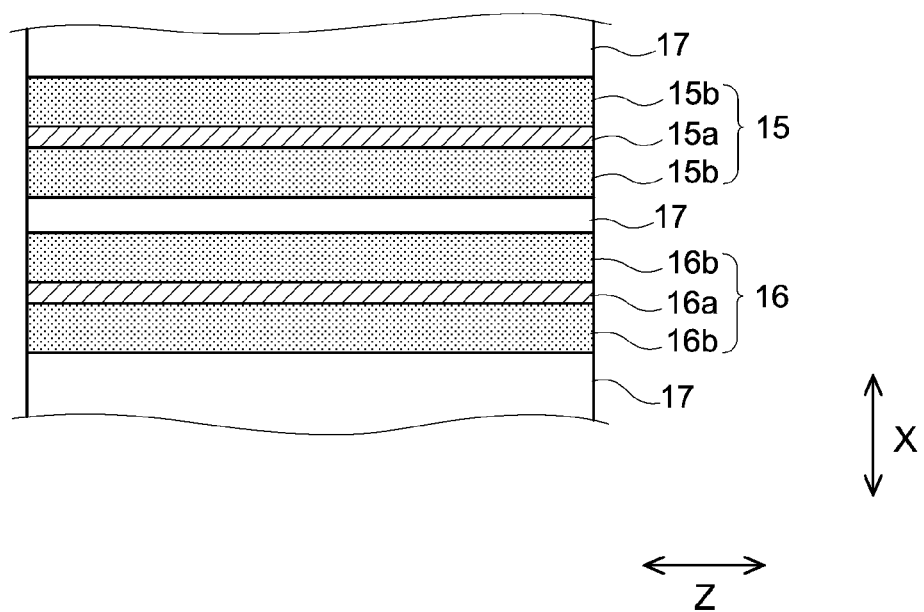
FIG. 3 is a cross-sectional view taken along the line III-III in FIG. 2.

FIG. 2 is a front view schematically showing a single cell used in the first embodiment. FIG. 3 is a cross-sectional view taken along the line III-III in FIG. 2. As described above, in the present embodiment, an all-solid-state cell of a lithium ion secondary battery is used as the single cell 10. As shown in FIG. 2, in addition to the pair of electrode terminals (the positive electrode terminal 12 and the negative electrode terminal 13) described above, the all-solid-state cell (single cell 10) includes the stacked electrode body 14 and an outer package body 11 made of a laminate film and accommodating the stacked electrode body 14. In the present embodiment, the stacked electrode body 14 is accommodated in the outer package body 11 so that the center of the stacked electrode body 14 and the center of the outer package body 11 are aligned in the width direction Y.

The Young's modulus of the stacked electrode body 14 may be set to 0.1 GPa or more, 0.5 GPa or more, 1 GPa or more, or even 1.5 GPa or more. In general, as the Young's modulus of the stacked electrode body 14 increases, the strength against external pressure rises, but the occurrence of uneven surface pressure due to manufacturing tolerance tends to be facilitated. However, with the battery pack according to the present embodiment, the surface pressure unevenness can be suitably prevented. Therefore, the stacked electrode body 14 having such a high Young's modulus can be preferably used. On the other hand, the upper limit of the Young's modulus of the stacked electrode body 14 is not particularly limited. The upper limit may be set to 4 GPa or less, 3.5 GPa or less, 3 GPa or less, or 2.5 GPa or less.

As shown in FIG. 3, the stacked electrode body 14 in the present embodiment is configured by stacking a plurality of sheet materials composed of a positive electrode 15, a negative electrode 16, and a solid electrolyte layer 17. Hereinafter, each layer constituting the stacked electrode body 14 will be described.

(a) Positive Electrode

The positive electrode 15 includes a positive electrode current collector 15a and a positive electrode mix layer 15b fixed to the surface (both surfaces) of the positive electrode current collector 15a. The positive electrode current collector 15a is a foil-shaped conductive member (aluminum foil or the like). Although illustration is omitted, the positive electrode current collector 15a is electrically connected to a positive electrode terminal 12. The positive electrode mix layer 15b includes at least a positive electrode active material. The positive electrode active material is a material capable of reversibly occluding and releasing charge carriers (for example, lithium ions). A material that can be used for this type of secondary battery can be used as the positive electrode active material without any particular limitation. Examples of such positive electrode active materials include lithium transition metal composite oxides such as lithium-nickel-containing composite oxides, lithium-cobalt-containing composite oxides, lithium-nickel-cobalt-containing composite oxides, lithium-manganese-containing composite oxides, lithium-nickel-cobalt-manganese-containing composite oxides and the like. The positive electrode mix layer 15b may include an additive (for example, a binder, a conductive material, and the like) other than the positive electrode active material. A material which can be added to the positive mix layer of a lithium ion secondary battery can be used, as needed, as the other additive, and since such material places no limitation on the present disclosure, detailed description thereof is omitted.

The positive electrode mix layer 15b of the all-solid-state cell also includes a powdered electrolyte (solid electrolyte material) in addition to the above-described materials. Since material of the same kind as the solid electrolyte material used in the solid electrolyte layer 17 can be used as the solid electrolyte material, detailed description thereof is herein omitted.

(b) Negative Electrode

The negative electrode 16 includes a negative electrode current collector 16a and a negative electrode mix layer 16b fixed to the surface (both surfaces) of the negative electrode current collector 16a. The negative electrode current collector 16a is a foil-shaped conductive member (copper foil or the like). Although illustration is omitted, the negative electrode current collector 16a is electrically connected to the negative electrode terminal 13. The negative electrode mix layer 16b includes at least a negative electrode active material. The negative electrode active material is a material capable of reversibly occluding and releasing charge carriers (for example, lithium ions). A material that can be used for this type of secondary battery can be used as the negative electrode active material without any particular limitation. Examples of the negative electrode active material include carbon materials such as hard carbon, graphite, boron-added carbon and the like. The negative electrode mix layer 16b may include, as needed, an additive (for example, a binder and the like) other than the negative electrode active material. A material which can be added to the negative mix layer of a lithium ion secondary battery can be used, as needed, as the other additive, and since such material places no limitation on the present disclosure, detailed description thereof is omitted. Further, in the all-solid-state cell according to the present embodiment, the negative electrode mix layer 16b also includes the same type of solid electrolyte material as the solid electrolyte layer 17.

(c) Solid Electrolyte Layer

The solid electrolyte layer 17 is disposed between the positive electrode 15 and the negative electrode 16. The solid electrolyte layer 17 is composed of a powdered electrolyte (solid electrolyte material) having Li ion conductivity and insulating properties. Although not particularly limited, a sulfide solid electrolyte material, an oxide solid electrolyte material, or the like can be used as the solid electrolyte material.

Examples of the sulfide solid electrolyte include glass or glass-ceramic such as $Li_2S$—$SiS_2$, $Li_2S$—$P_2S_3$, $Li_2S$—$P_2S_5$, $Li_2S$—$GeS_2$, $Li_2S$—$B_2S_3$, $Li_3PO_4$—$P_2S_5$, $Li_4SiO_4$—$Li_2S$—$SiS_2$, and the like. Further, from the viewpoint of realizing higher ion conductivity, a $Li_2S$-based solid solution composed of $Li_2S$ and a lithium halide (for example, LiCl, LiBr, and LiI) is preferably used for the sulfide solid electrolyte. Preferable examples of such a sulfide solid electrolyte include LiBr—$Li_2S$—$P_2S_5$, LiI—$Li_2S$—$P_2S_5$, LiBr—LiI—$Li_2S$—$P_2S_5$, and the like. These sulfide solid electrolyte materials are superior in ionic conductivity compared to oxide solid electrolyte materials.

Meanwhile, examples of the oxide solid electrolyte material include lithium-lanthanum-zirconium-containing composite oxides (LLZO), Al-doped LLZO, lithium-lanthanum-titanium-containing composite oxides (LLTO), Al-doped LLTO, and lithium phosphate oxynitride (LIPON), and the like. These oxide solid electrolyte materials are superior to sulfide solid electrolyte materials in chemical stability.

The solid electrolyte layer 17 may include various additives (for example, a binder and the like) other than the solid electrolyte material. A material which can be added to the solid electrolyte layer of a lithium ion secondary battery can be used, as needed, as the other additive, and since such material places no limitation on the present disclosure, detailed description thereof is omitted.

(3) Elasticity of Cell Group

In the cell group A of the battery pack 1 according to the present embodiment, the elasticity along the arrangement direction X is uniform in a front view. Accordingly, it is possible to prevent the surface pressure applied to the cell group A from being uneven when the cell group A is restrained by the restraining member 20, and a high level of battery performance can be stably demonstrated.

Figure 4:
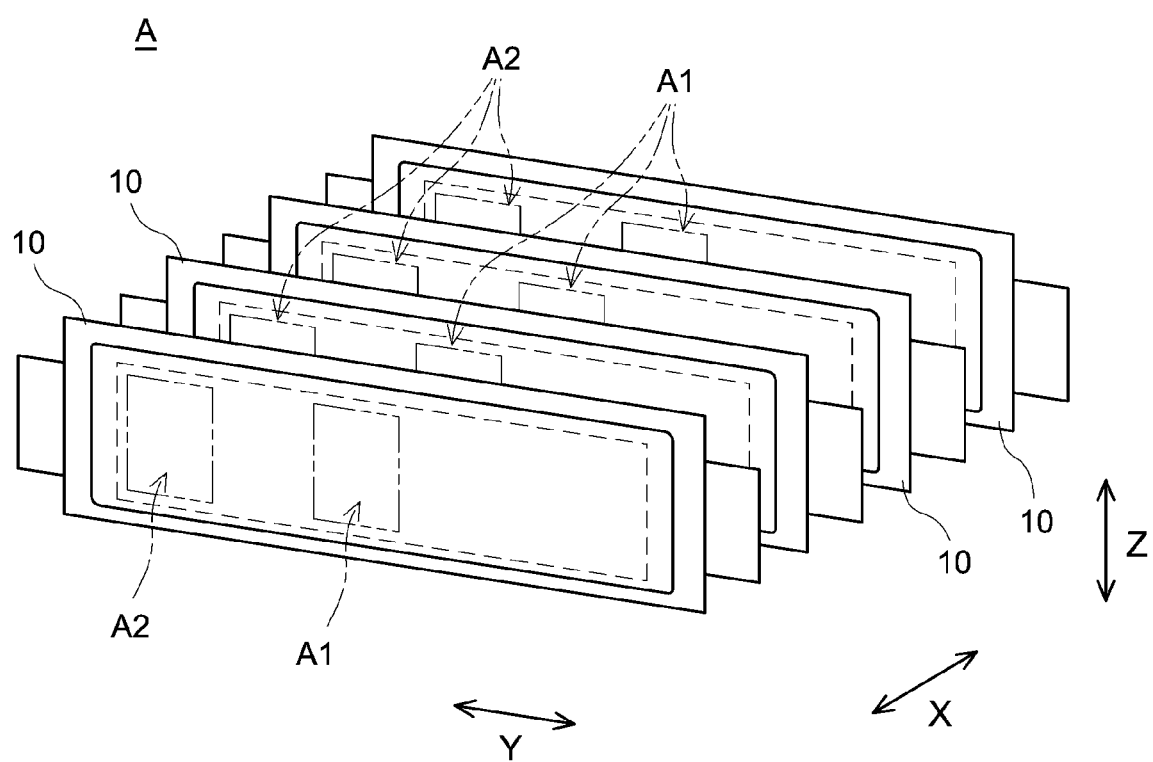
FIG. 4 is a perspective view schematically showing a cell group in the first embodiment.

Hereinafter, the elasticity of the cell group A in the present embodiment will be described with reference to FIGS. 4 and 5. FIG. 4 is a perspective view schematically showing a cell group in the first embodiment. As shown in FIG. 1, the cell group A in this embodiment is constructed by arranging a plurality of single cells 10 in close contact with each other. However, for convenience of explanation, FIG. 4 shows the cell group A in the present embodiment in a state where a predetermined interval is provided between the single cells 10.

As described above, the cell group A in the present embodiment is configured such that the elasticity along the arrangement direction X is uniform in a front view. In other words, the cell group A of the present embodiment is configured such that, in a front view, where a spring constant in a region having a maximum spring constant along the arrangement direction X is taken as a maximum value $K_1$, and the spring constant in a region having a minimum spring constant along the arrangement direction X is taken as a minimum value $K_2$, a relationship between the maximum value $K_1$ and the minimum value $K_2$ satisfies formula (1) hereinbelow. In FIG. 4, a region of each single cell 10 overlapped with a region A1 is shown as "the region having a maximum spring constant". The region A1 having a maximum spring constant indicates a region obtained by dividing the front surface of the cell group A into a plurality of (preferably three or more) regions along the width direction Y, measuring the spring constant in each region, and selecting the region with the largest spring constant (the region where the maximum value $K_1$ of the spring constant is obtained). Meanwhile, in FIG. 4, a region of each single cell 10 overlapped with a region A2 is shown as "the region having a minimum spring constant". This region A2 having a minimum spring constant indicates a region in which the spring constant is the smallest among the plurality of the divided regions (the region where the minimum value $K_2$ of the spring constant is obtained). The "spring constant" in the present specification is a value measured by applying a load along the arrangement direction X to compress a region to be measured using an autograph and dividing the load at this time by the amount of displacement.

$$1 \leq K_1/K_2 \leq 3 \tag{1}$$

As described above, by constructing the cell group A in which the elasticity along the arrangement direction X is uniform in a front view, it is possible to prevent the surface pressure applied to the cell group A from being uneven at the time of restraint. For this reason, with the battery pack according to the present embodiment, it is possible to prevent voids from being generated between the sheet materials (the positive electrode 15, the negative electrode 16, and the solid electrolyte layer 17) constituting the stacked electrode body 14 (see FIG. 3) and a high level of battery performance can be stably demonstrated.

From the viewpoint of more reliably preventing the surface pressure applied to the cell group A from being uneven, the upper limit of the ratio ($K_1/K_2$) of the maximum value $K_1$ of the spring constant to the minimum value $K_2$ of the spring constant is 2 preferably or less, and more preferably 1.5 or less.

In addition, various structures can be adopted as a specific structure for making the elasticity of the cell group A uniform in a front view ($K_1/K_2$ is 3 or less). Hereinafter, an example of a specific structure for making the elasticity of the cell group A uniform in a front view will be described with reference to FIG. 5. FIG. 5 is a plan view schematically showing a cell group in the first embodiment.

Figure 5:
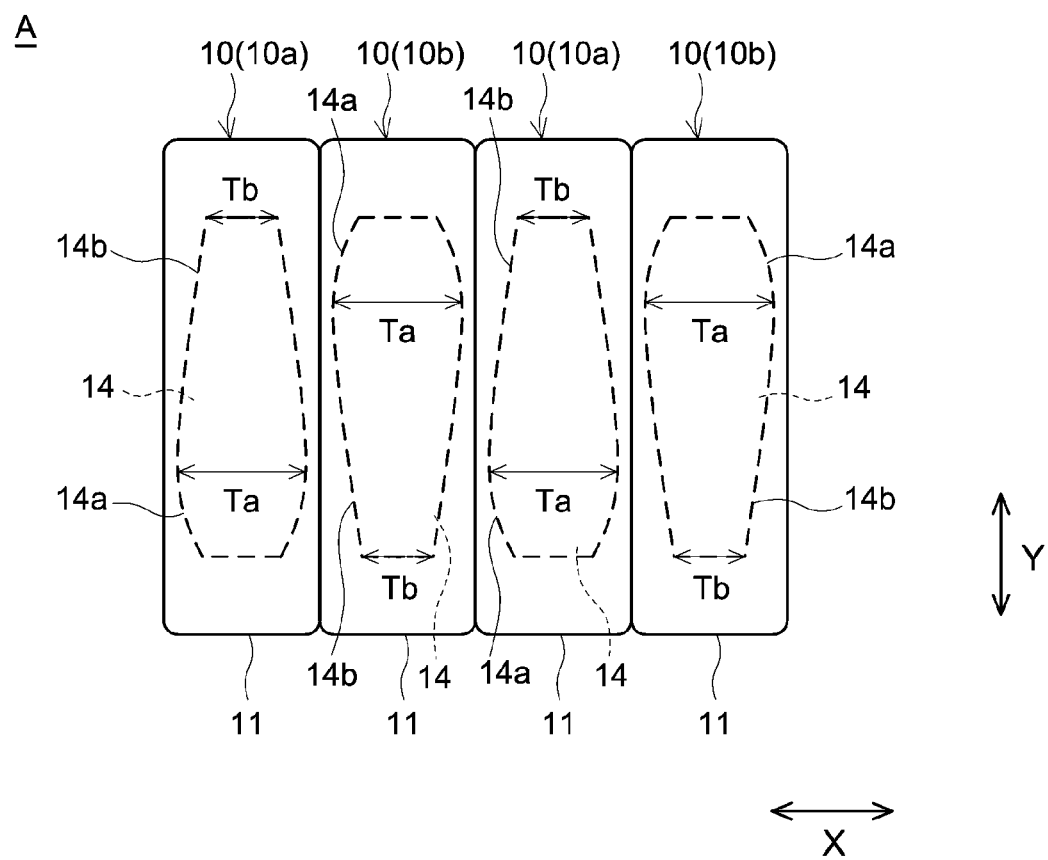
FIG. 5 is a plan view schematically showing a cell group in the first embodiment.

As shown in FIG. 5, the battery pack according to the present embodiment is configured such that the sum total of thicknesses of the plurality of stacked electrode bodies 14 included in the cell group A (total thickness of the stacked electrode bodies) is uniform in a front view. In general, in an all-solid-state cell using an outer package body made of a laminate film, the total thickness of the stacked electrode body greatly affects the elasticity of the cell group in the arrangement direction. In the present embodiment, the elasticity of the cell group A is made uniform in a front view by making the total thickness of the stacked electrode body 14 uniform in a front view.

Specifically, in the present embodiment, the thickest part 14a is formed at one end in the width direction Y of the stacked electrode body 14 of each single cell 10, and the thinnest part 14b is formed at the other end. As will be described in detail hereinbelow, the stacked electrode body 14 having such thickest part 14a and thinnest part 14b can be produced by the following procedure. First, the thickest part and the thinnest part are formed in each of a plurality of sheet materials (the positive electrode 15, the negative electrode 16, and the solid electrolyte layer 17 in FIG. 3) constituting the stacked electrode body 14. Then, the thickest parts (thinnest parts) of each sheet material are stacked together when producing the stacked electrode body 14. As a result, the stacked electrode body 14 having the thickest part 14a and the thinnest part 14b can be manufactured. From the viewpoint of more suitably uniformizing the spring constant, the ratio ($T_a/T_b$) of the thickness $T_a$ of the thickest part 14a to the thickness $T_b$ of the thinnest part 14b of the stacked electrode body 14 is preferably 1.01 or more, more preferably 1.02 or more, even more preferably 1.03 or more, and particularly preferably 1.05 or more. The upper limit of $T_a/T_b$ may be 1.5 or less, 1.4 or less, or 1.3 or less. In consideration of manufacturing restrictions, the upper limit of $T_a/T_b$ is suitably about 1.2 or less.

In the cell group A in the present embodiment, each single cell 10 is disposed so that the thickest part 14a of the stacked electrode body 14 of one single cell 10 is adjacent to the thinnest part 14b of the stacked electrode body 14 of the other single cell 10 between the two adjacent single cells 10. That is, in the cell group A of the present embodiment, the single cells 10a in which the thickest part 14a is disposed on the lower side (one side in the width direction Y) in FIG. 5 and the single cells 10b in which the thickest part 14a is disposed on the upper side in FIG. 5 (the other side in the width direction Y) are disposed alternately.

Thus, in the cell group A in which the single cells 10a, 10b are disposed in this way, the total thickness of the stacked electrode bodies 14 is substantially the same in any of the plurality of regions divided in a front view. In other words, where the total thickness in a region having a maximum total thickness of the stacked electrode bodies 14 is taken as a maximum value $T_1$ (mm), and the total thickness in a region having a minimum total thickness is taken as a minimum value $T_2$ (mm), a relationship between the maximum value $T_1$ and the minimum value $T_2$ satisfies formula (2). As a result, the elasticity of the cell group A can be made uniform at the front surface (the above formula (1) is satisfied), so that it is possible to prevent a decrease in battery performance caused by uneven surface pressure at the time of restraint.

$$1 \le T_1/T_2 \le 1.01 \qquad (2)$$

Moreover, in the battery pack according to the present embodiment, as described above, a pressure dispersion material such as a buffer plate is not inserted between the single cells 10, and the single cells 10 are arranged in close contact with each other. Such a pressure dispersion material has a function of dispersing the restraining pressure from the restraining member 20 in a front view and eliminating the unevenness of the surface pressure applied to the cell group A. However, since the installation space when using a battery pack is limited, the insertion of the pressure dispersion material accordingly reduces the size of each single cell. For this reason, the pressure dispersion material causes the energy density of the whole battery pack to fall. With the battery pack according to the present embodiment, it is possible to prevent uneven surface pressure without using such a pressure dispersion material, and thus it is possible to contribute to realizing a battery pack having a high energy density.

Here, the "pressure dispersion material" is a plate-shaped member having predetermined thickness and rigidity, and refers to a member having a function of dispersing the restraining pressure from the restraining member 20 to a uniform surface pressure and transmitting the uniform surface pressure to each single cell 10. That is, "the pressure dispersion material is not inserted between the single cells" in the present specification is inclusive of a mode in which a thin sheet-shaped member having no function of dispersing the restraining pressure is inserted between the single cells.

(4) Production of Battery Pack

Next, the procedure for producing the battery pack 1 according to the present embodiment will be described.

(a) Production of Sheet Material

Figure 6:
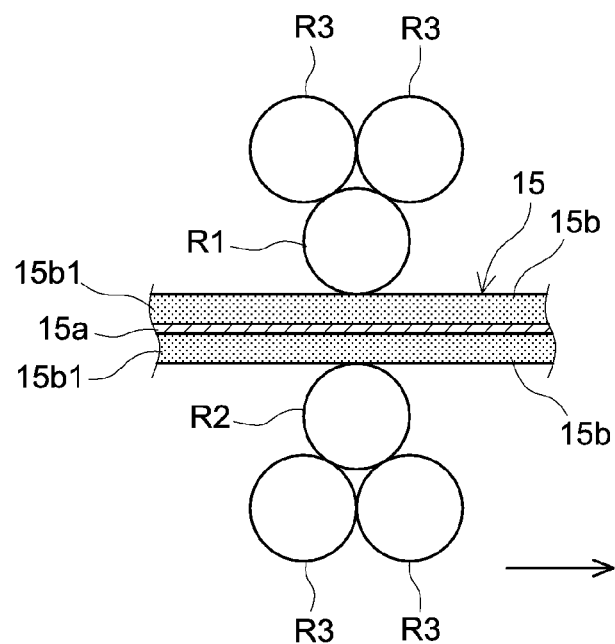
FIG. 6 is a side view for explaining an example of production of a positive electrode in the first embodiment.
Figure 7:
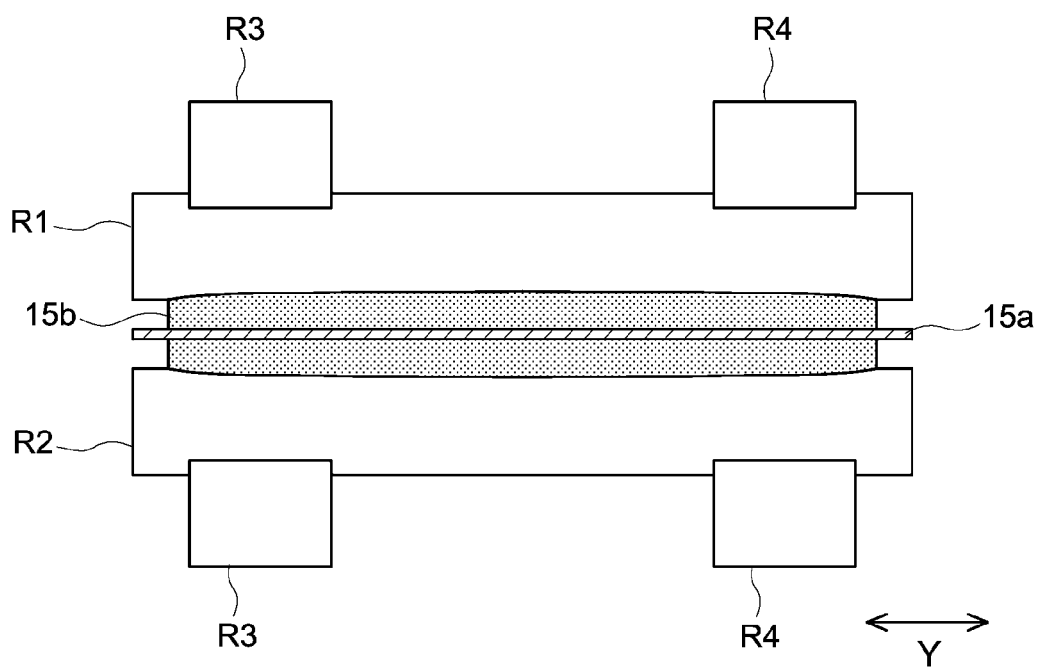
FIG. 7 is a front view for explaining an example of production of the positive electrode in the first embodiment.

In this step, a sheet material is produced in which the thickest part is formed at one end in the width direction and the thinnest part is formed at the other end. Here, a procedure for producing the sheet material is exemplified by a procedure for producing the positive electrode 15. FIG. 6 is a side view for explaining an example of production of the positive electrode in the first embodiment, and FIG. 7 is a front view.

As shown in FIG. 6, when the positive electrode 15 is produced, first, a positive electrode paste 15b1 which is a precursor of the positive electrode mix layer 15b is applied to both surfaces of the positive electrode current collector 15a. Then, the positive electrode paste 15b1 is dried and thereafter rolled with a pair of rolling rolls R1, R2. As a result, the dried positive electrode paste 15b1 is condensed to form a high-density positive electrode mix layer 15b, and the positive electrode mix layer 15b is fixedly attached to both surfaces of the positive electrode current collector 15a. At this time, in the present embodiment, support rolls R3, R4 that press the rolling rolls R1, R2 toward the positive electrode current collector 15a are disposed at both ends in the axial direction of the pair of rolling rolls R1, R2 (see FIG. 7). When the positive electrode 15 is rolled while pressing both ends of the rolling rolls R1, R2 with the support rolls R3, R4, the axially central portion of the rolling rolls R1, R2 is bent radially outward. As a result, the central portion in the width direction Y of the positive electrode 15 after the production becomes thicker than both end portions (see FIG. 8). Then, by cutting the produced positive electrode 15 at the center CL in the width direction Y, two positive electrodes 15 in which the thickest part 15c is formed at one end and the thinnest part 15d is formed at the other end can be produced. Since the thickest part and the thinnest part can be formed according to the same procedure as the positive electrode 15 also at the other sheet materials (the negative electrode 16 and the solid electrolyte layer 17), detailed description thereof is omitted.

(b) Production of Single Cell

In this step, the stacked electrode body 14 is produced by sequentially stacking the positive electrode 15, the solid electrolyte layer 17, and the negative electrode 16 so that the thickest parts are adjacent between the respective sheet materials. As a result, the thickest part 14a in which the thickest parts of the sheet materials are stacked is formed at one end in the width direction Y of the stacked electrode body 14 after the production (see FIG. 5). Similarly, the thinnest part 14b in which the thinnest parts of the sheet materials are stacked is formed at the other end in the width direction Y of the stacked electrode body 14. The positive electrode terminal 12 is connected to the positive electrode 15 of the stacked electrode body 14, and the negative electrode terminal 13 is connected to the negative electrode 16. Then, the single cell 10 is produced by accommodating the stacked electrode body 14 in the outer package body 11 (see FIG. 2).

(c) Construction of Battery Pack

Next, the cell group A is constructed by arranging the produced single cells 10. At this time, as shown in FIG. 5, a plurality of single cells 10a, 10b are sequentially arranged so that the thickest part 14a of the stacked electrode body 14 of one single cell 10a is adjacent to the thinnest part 14b of the stacked electrode body 14 of the other single cell 10b among the two adjacent single cells 10a, 10b. As a result, a cell group A in which the elasticity is uniform in a front view ($K_1/K_2$ is 3 or less) is constructed. As shown in FIG. 1, the battery pack 1 according to the present embodiment is constructed by restraining the cell group A along the arrangement direction X by the restraining member 20.

In the present embodiment, the stacked electrode bodies 14 having the thickest part 14a and the thinnest part 14b are intentionally formed as in the above-described production procedure, and the single cells 10 are arranged so that the total thickness of the stacked electrode bodies 14 is uniform in a front view. As a result, it is possible to reduce the influence of manufacturing tolerance that can occur when producing the sheet materials. For this reason, according to this embodiment, the cell group A in which the elasticity along the arrangement direction X is uniform in a front view can be easily constructed.

The procedure for producing the battery pack is not limited to the embodiment described above. For example, in the embodiment described above, as shown in FIGS. 7 and 8, the positive electrode 15 (sheet material) in which the central part in the width direction becomes thicker is produced by disposing the support rolls R3, R4 at both ends in the axial direction of the rolling rolls R1, R2. Then, the positive electrode 15 (sheet material) is cut at the center CL in the width direction to produce the positive electrode 15 (sheet material) having the thickest part 15c and the thinnest part 15d. However, the method for producing the sheet material having the thickest part and the thinnest part is not limited to the above-described method. For example, a sheet material in which the thickest part is formed at one end in the width direction and the thinnest part is formed at the other end can be produced by disposing the support roll only at one end in the axial direction of the rolling roll.

Figure 8:
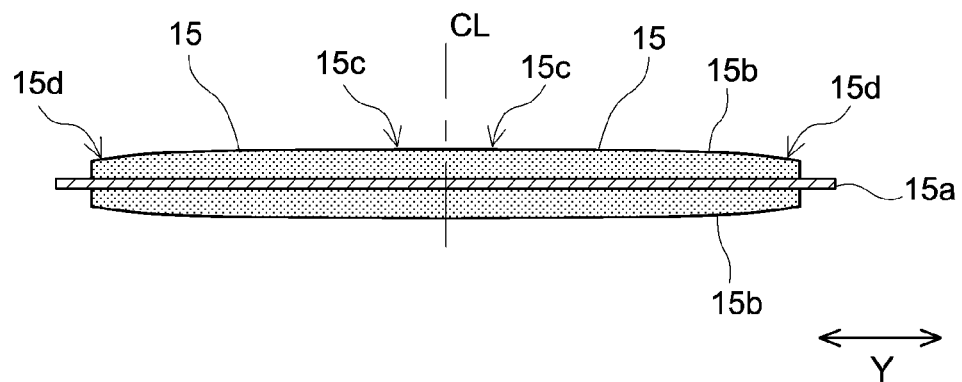
FIG. 8 is a front view schematically showing the positive electrode after rolling.
Figure 9:
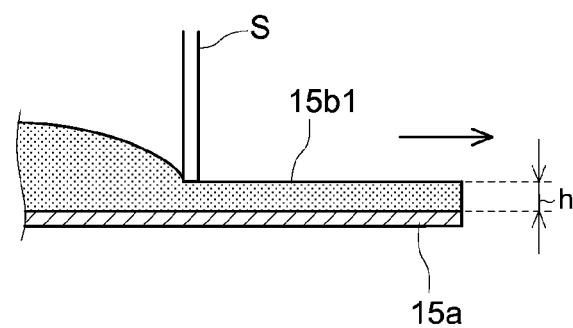
FIG. 9 is a side view for explaining another example of production of the positive electrode in the first embodiment.
Figure 10:
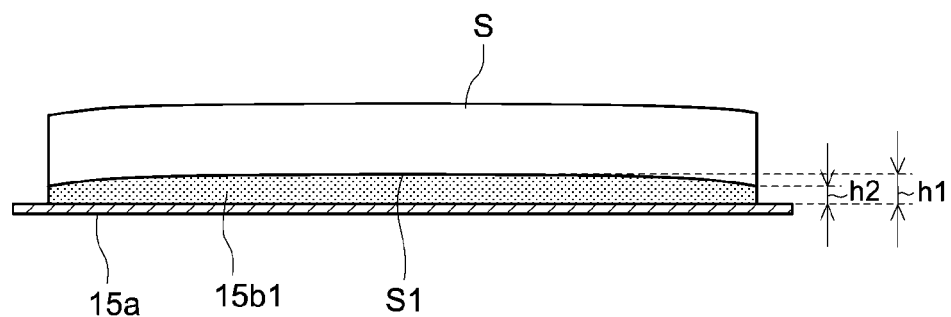
FIG. 10 is a front view for explaining another example of production of the positive electrode in the first embodiment.

Further, a sheet material having the thickest part and the thinnest part can be produced using an apparatus other than the support rolls. For example, as shown in FIG. 9, in the production of the positive electrode 15, a slit S may be used to control the thickness of the positive electrode paste 15b1 before rolling. Specifically, the slit S is disposed on the conveyance path in the positive electrode manufacturing process, and the positive electrode paste 15b1 applied beyond a desired thickness is removed by maintaining the slit S at a certain height h. As an example of the production of the sheet material, as shown in FIG. 10, a slit S in which a lower end S1 is curved so that a height h1 at the center in the width direction Y is larger than a height h2 at both ends is used in the step of controlling the paste thickness. As a result, it is possible to produce a positive electrode 15 in which the thickness in the central portion in the width direction Y is larger than in the other portions as shown in FIG. 8. The positive electrode 15 which has the thickest part 15c and the thinnest part 15d can be produced by cutting at the center CL in the width direction Y of this positive electrode 15.

2. Other Embodiments

The battery pack according to the first embodiment of the present disclosure has been described above. However, the art disclosed herein is not limited to the above-described embodiments, and may include other embodiments. Specifically, the battery pack disclosed herein is characterized by the fact that the spring constant of the cell group is uniform in a front view. For this reason, the specific structure for making the spring constant of a cell group uniform is not limited to the embodiment described hereinabove.

(1) Second Embodiment

Figure 11:
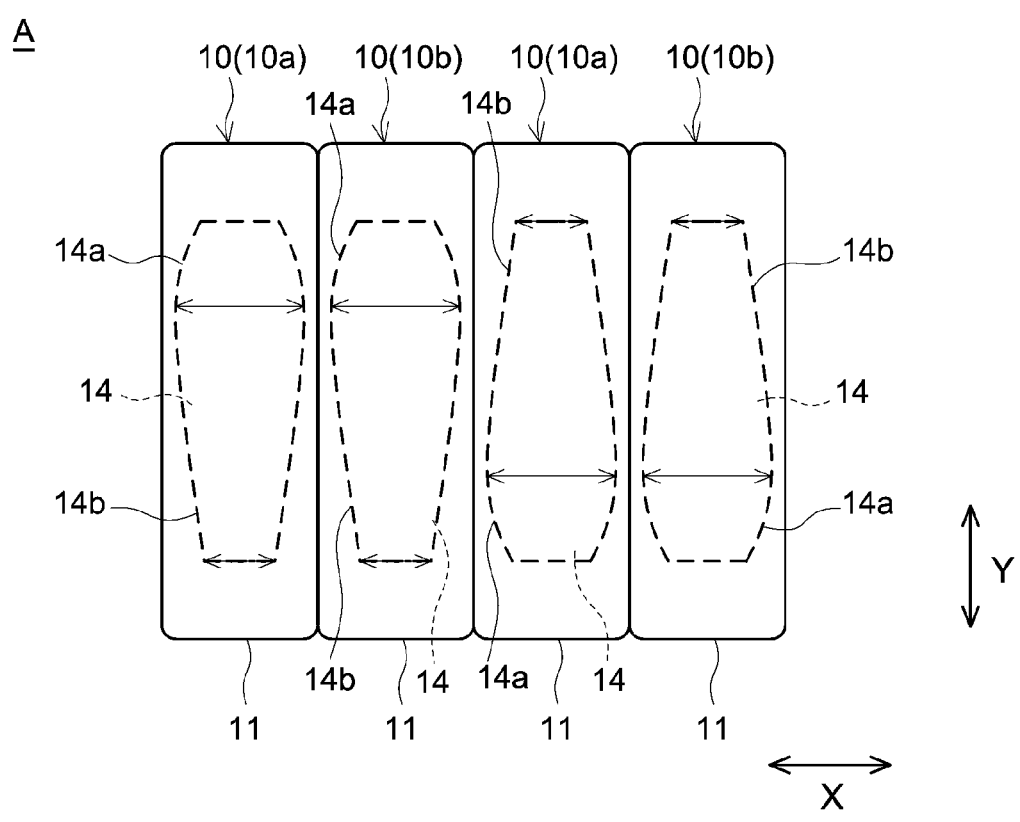
FIG. 11 is a plan view schematically showing a cell group of the battery pack according to the second embodiment.

FIG. 11 is a plan view schematically showing a cell group of a battery pack according to the second embodiment. As shown in FIG. 11, the battery pack according to the second embodiment also uses a stacked electrode body 14 in which the thickest part 14a is formed at one end in the width direction Y and the thinnest part 14b is formed at the other end. However, in the construction of the cell group A in the present embodiment, two single cells 10a in which the thickest part 14a of the stacked electrode body 14 is formed on the upper side in the drawing are successively arranged and then two single cells 10b in which the thickest part 14a is formed on the lower side in the drawing are successively arranged from the upstream side toward the downstream side in the arrangement direction X. Where the cell group A is constructed in this way, the total thickness of the stacked electrode body 14 is also made uniform in a front view (the above formula (2) is satisfied), so the elasticity of the cell group A along the arrangement direction X can be made uniform in a front view (the cell group A satisfying the above formula (1) can be constructed). For this reason, in this embodiment, the unevenness of the surface pressure when the restraining member is attached can be prevented, and a high level of battery performance can be stably demonstrated.

(2) Third Embodiment

In the first and second embodiments described above, the stacked electrode body 14 having the thickest part 14a and the thinnest part 14b is used. However, the stacked electrode body in the battery pack disclosed herein may not have the thickest part and the thinnest part.

Figure 12:
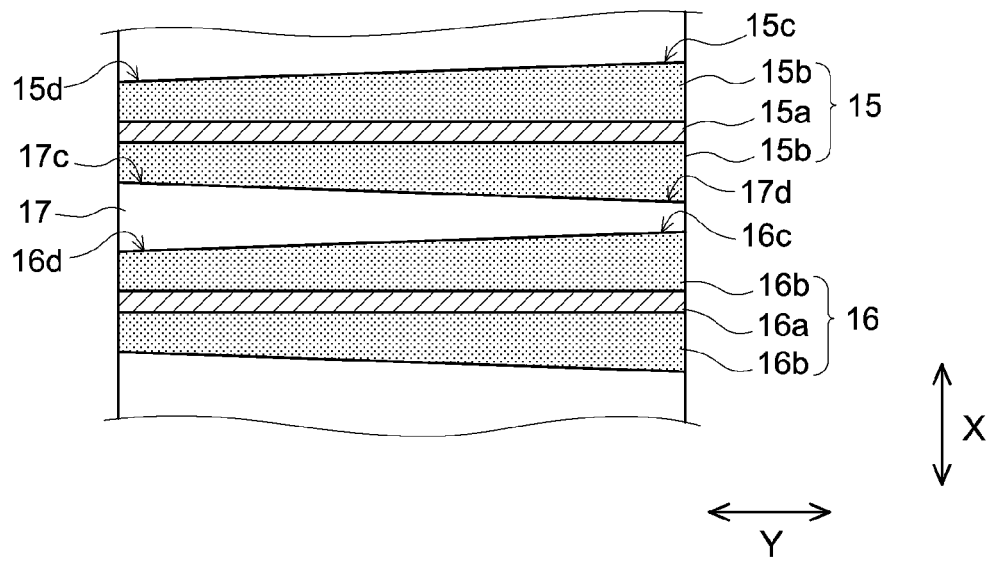
FIG. 12 is a cross-sectional view schematically showing a stacked electrode body of a battery pack according to the third embodiment.

FIG. 12 is a cross-sectional view schematically showing a stacked electrode body of a battery pack according to the third embodiment. In the third embodiment, the thickest part is formed at one end in the width direction Y of each of the plurality of sheet materials (the positive electrode 15, the negative electrode 16, and the solid electrolyte layer 17) constituting the stacked electrode body 14, and the thinnest part is formed at the other end. Specifically, in the second embodiment, the thinnest part 15d is formed at one end (left side in FIG. 12) in the width direction Y of the positive electrode 15, and the thickest part 15c is formed at the other end (right side in FIG. 12). Further, the thickest part 17c is formed at one end portion in the width direction Y of the solid electrolyte layer 17, and the thinnest part 17d is formed at the other end. The thinnest part 16d is formed at one end of the negative electrode 16, and the thickest part 16c is formed at the other end.

The sheet materials are then stacked so that the thickest part of one sheet material is adjacent to the thinnest part of the other sheet material among the adjacent sheet materials. As a result, the stacked electrode body 14 having a uniform thickness in a front view can be produced. Then, where the single cells each having the stacked electrode body 14 having a uniform thickness in a front view are sequentially arranged, a cell group in which the total thickness of the stacked electrode bodies is uniform in a front view (the cell group satisfying the above formula (2)) can be constructed.

(3) Fourth Embodiment

In the battery packs according to the first to third embodiments described above, a cell group having a uniform spring constant in a front view is constructed by making the total thickness of the plurality of stacked electrode bodies included in the cell group uniform in a front view. However, a specific structure for constructing a cell group having a uniform spring constant in a front view is not limited to the above-described embodiments. That is, a cell group having a uniform spring constant in a front view can be constructed even when the total thickness of the stacked electrode bodies is not uniform in a front view.

Specifically, in the fourth embodiment, a thickest part 14e is formed at the center in the width direction Y of the stacked electrode body 14 of each single cell 10, and a thinnest part 14f is formed at both ends. In each single cell 10, the stacked electrode body 14 is accommodated in the outer package body 11 in a state where the center CL2 in the width direction Y of the stacked electrode body 14 is shifted from the center CL1 in the width direction Y of the outer package body 11. At this time, the accommodation positions of the stacked electrode bodies 14 in the two adjacent single cells 10c, 10d are adjusted so that the thickest part 14e of the stacked electrode body 14 of one single cell 10c is adjacent to the thinnest part 14f of the stacked electrode body 14 of the other single cell 10d. Specifically, in the present embodiment, the single cells 10c in which the center CL2 of the stacked electrode body 14 is shifted to the upper side in the drawing and the single cells 10d in which the center of the stacked electrode body 14 is shifted to the lower side in the drawing with respect to the center CL1 of the outer package body 11 are disposed alternately. It has been confirmed by experiments that the spring constant along the arrangement direction X is uniform in a front view also in the cell group A having such a structure.

Figure 13:
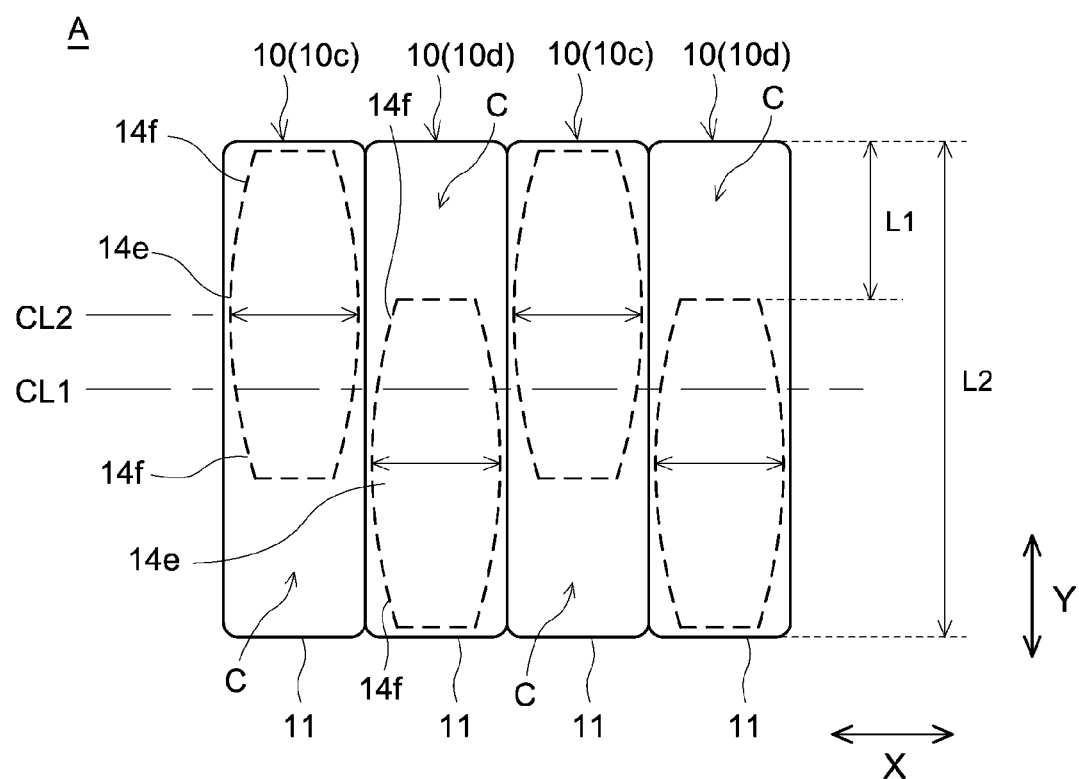
FIG. 13 is a plan view schematically showing a cell group of the battery pack according to the fourth embodiment.

Further, as shown in FIG. 13, a clearance gap C has appeared at one side edge of the width direction Y inside the outer package body 11 of each single cell 10. The size of the gap C is preferably adjusted, as appropriate, from the viewpoint of making the elasticity of the cell group A uniform in a front view. For example, the ratio (L1/L2) of the length L1 of the gap C to the length L2 of the outer package body 11 in the width direction Y may be set to 0.3 or less, 0.2 or less, 0.1 or less, and or even 0.03 or less.

Test Examples

Hereinafter, test examples relating to the present disclosure will be described, but the following test examples are not intended to limit the present disclosure.

1. Production of Each Sample (1) Materials of Single Cell

In this test example, an all-solid-state cell in which a stacked electrode body in which 30 positive electrodes, 30 solid electrolyte layers, and 30 negative electrodes were stacked was accommodated inside an outer package body made of a laminate film was used as a single cell. In the present test, a lithium nickel chromium manganese composite oxide (NCM) was used as the positive electrode active material, a sulfide solid electrolyte was used as the solid electrolyte material, and graphite was used as the negative electrode active material. Further, a fluororesin was used as a binder in each layer of the positive electrode, negative electrode, and solid electrolyte layer.

(2) Samples 1 and 2

In samples 1 and 2, a cell group A as shown in FIG. 5 was constructed. That is, in the production of the single cell, the stacked electrode body 14 having the thickest part 14a at one end in the width direction Y and the thinnest part 14b at the other end was produced. Then, a cell group A was constructed in which four single cells were sequentially arranged so that between the adjacent single cells 10a and 10b, the thickest part 14a of the stacked electrode body 14 of one single cell 10a was adjacent to the thinnest part 14b of the stacked electrode body of the other single cell 10b. The constructed cell group A was sandwiched between aluminum restraining plates and restrained with a restraining pressure of 50 kN. In this test, the thickness of the stacked electrode body 14 was adjusted so that the ratio ($T_1/T_2$) of the maximum value $T_1$ to the minimum value $T_2$ of the total thickness of the stacked electrode bodies was different between the samples 1 and 2. Table 1 shows $T_1/T_2$ of each sample.

(3) Sample 3

In sample 3, four single cells in which the thickest part and the thinnest part were not formed on either the sheet materials or the stacked electrode body were produced. A cell group was formed by sequentially arranging the single cells. Other conditions were set the same as for samples 1 and 2.

2. Evaluation Test

The front surface of the cell groups A of samples 1 to 3 was divided into three regions in the width direction Y, and the spring constant in each region was measured with an autograph. Then, the ratio ($K_1/K_2$) of the maximum value $K_1$ to the minimum value $K_2$ of the measured spring constant was calculated. For each of samples 1 to 3, the battery resistance of the battery pack after the restraint was measured. The results are shown in Table 1. "Battery resistance" in Table 1 is a value when the battery resistance of sample 1 is taken as a reference value (1.00).

TABLE 1

| Sample | Ratio of total thicknesses ($T_1/T_2$) | Ratio of spring constants ($K_1/K_2$) | Battery resistance |
|---|---|---|---|
| 1 | 1 | 1 | 1 |
| 2 | 1.01 | 3 | 1.02 |
| 3 | 1.03 | 9 | 1.1 |

As shown in Table 1, in samples 1 and 2, good battery performance with a battery resistance of 1.02 or less was obtained. From this, it was found that a high level of battery performance can be demonstrated by constructing a cell group in which the elasticity along the arrangement direction is uniform in a front view (the $K_1/K_2$ is 3 or less).

Although specific examples of the present disclosure have been described in detail above, these are merely examples and do not limit the scope of the claims. The art set forth in the claims is inclusive of various modifications and changes of the specific examples illustrated above.

What is claimed is:

1. A battery pack comprising:
a cell group in which a plurality of single cells are arranged along a predetermined arrangement direction; and
a restraining member that restrains the cell group along the arrangement direction, wherein
each of the single cells is an all-solid-state cell including a stacked electrode body in which a plurality of sheet materials composed of a positive electrode, a negative electrode, and a solid electrolyte layer are stacked, and an outer package body that is made of a laminate film and accommodates the stacked electrode body,
the cell group is configured such that, in a front view, where a spring constant in a region having a maximum spring constant along the arrangement direction is taken as a maximum value K1, and a spring constant in a region having a minimum spring constant along the arrangement direction is taken as a minimum value K2, a relationship between the maximum value K1 and the minimum value K2 satisfies formula (1) below: and
the cell group is configured such that, in a front view, where a total thickness in a region having a maximum total thickness of a plurality of the stacked electrode bodies is taken as a maximum value T1, and a total thickness in a region having a minimum total thickness of the plurality of the stacked electrode bodies is taken as a minimum value T2, a relationship between the maximum value T1 and the minimum value T2 satisfies formula (2) below:

$$1 \leq K1/K2 \leq 3 \quad (1)$$

$$1 \leq T1/T2 \leq 1.01 \quad (2).$$

2. The battery pack according to claim 1, wherein a thickest part is formed at one end in a width direction of each of the stacked electrode bodies, a thinnest part is formed at the other end in the width direction of each of the stacked electrode bodies, and the cell group is configured such that, between two of the single cells adjacent to each other, the thickest part of the stacked electrode body of one single cell is adjacent to the thinnest part of the stacked electrode body of the other single cell.

3. The battery pack according to claim 1, wherein a thickest part is formed at one end in a width direction of each of the sheet materials, a thinnest part is formed at the other end in the width direction of each of the sheet materials, and the stacked electrode body is configured such that, between two of the sheet materials adjacent to each other, the thickest part of one sheet material is adjacent to the thinnest part of the other sheet material.

4. A battery pack comprising:
a cell group in which a plurality of single cells are arranged along a predetermined arrangement direction; and
a restraining member that restrains the cell group along the arrangement direction, wherein
each of the single cells is an all-solid-state cell including a stacked electrode body in which a plurality of sheet materials composed of a positive electrode, a negative electrode, and a solid electrolyte layer are stacked, and an outer package body that is made of a laminate film and accommodates the stacked electrode body,
the cell group is configured such that, in a front view, where a spring constant in a region having a maximum spring constant along the arrangement direction is taken as a maximum value K1, and a spring constant in a region having a minimum spring constant along the arrangement direction is taken as a minimum value K2, a relationship between the maximum value K1 and the minimum value K2 satisfies formula (1) below: and
a thickest part is formed at a center in the width direction of each of the stacked electrode bodies, a thinnest part is formed at both ends in the width direction of each of the stacked electrode bodies, and the stacked electrode bodies are accommodated in the outer package body in a state where the center in the width direction of each of the stacked electrode bodies is shifted from a center in a width direction of the outer package body, so that, between two of the single cells adjacent to each other, the thickest part of the stacked electrode body of one single cell is adjacent to the thinnest part of the stacked electrode body of the other single cell:

$$1 \leq K1/K2 \leq 3.$$

5. The battery pack according to claim 1, wherein the stacked electrode body has a Young's modulus of 0.1 GPa or more.

* * * * *